Oct. 22, 1957     M. J. CARROLL     2,810,480
APPARATUS FOR HANDLING ELONGATED OBJECTS
Filed Jan. 28, 1954     3 Sheets-Sheet 1
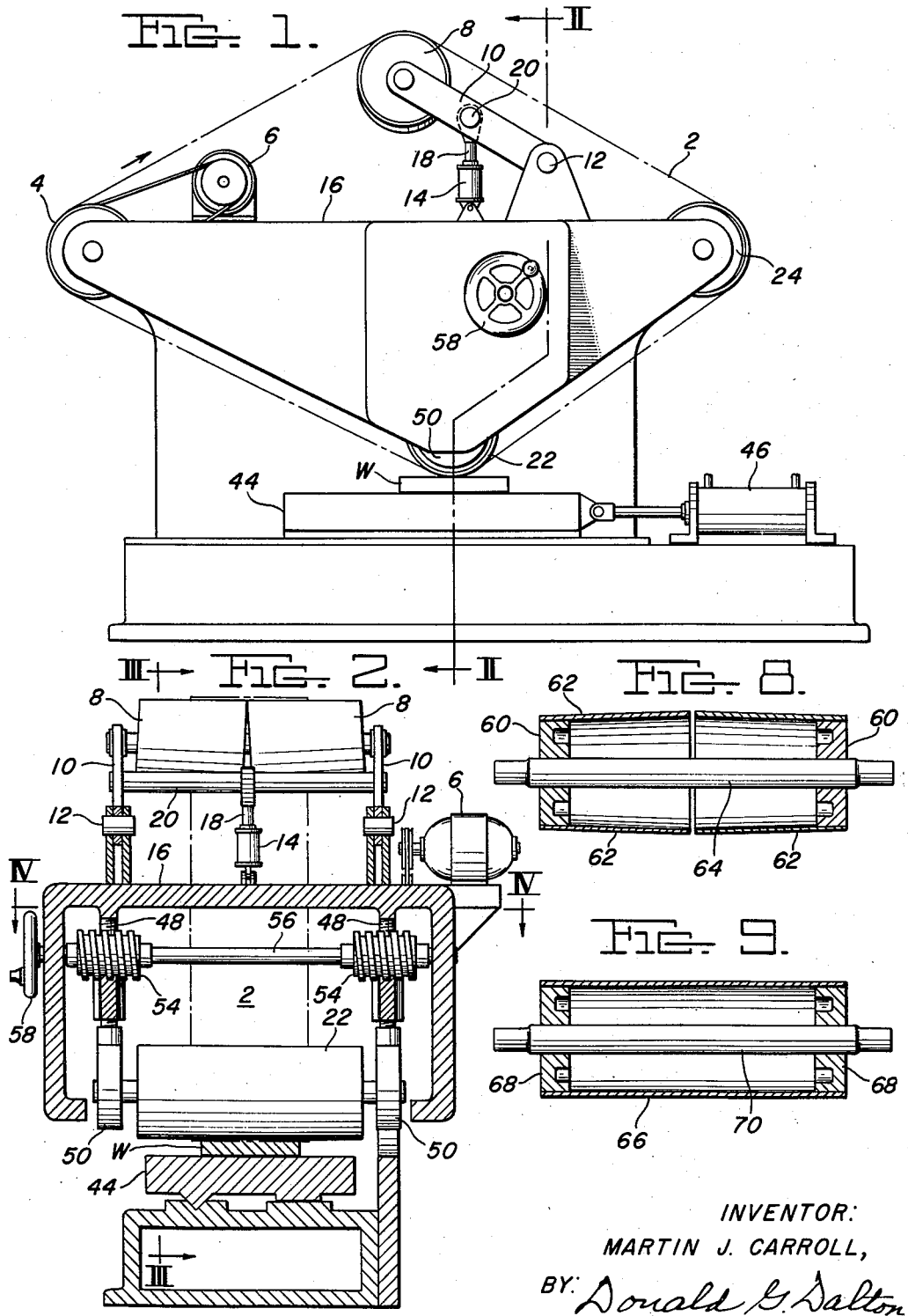
INVENTOR:
MARTIN J. CARROLL,
BY: Donald G. Dalton
his Attorney.

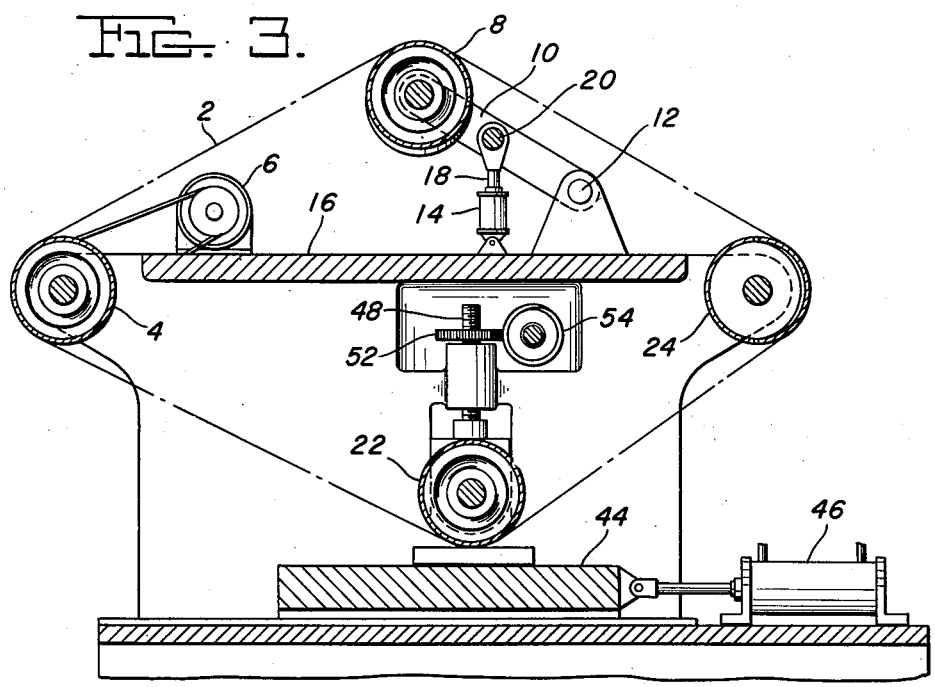
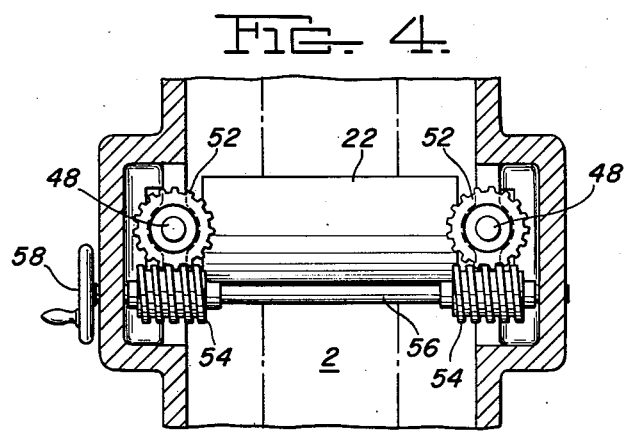
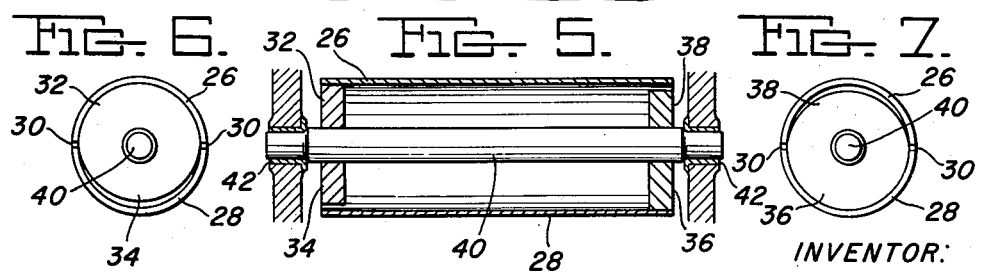
INVENTOR:
MARTIN J. CARROLL,
BY: Donald G. Dalton
his Attorney.

Oct. 22, 1957　　　M. J. CARROLL　　　2,810,480
APPARATUS FOR HANDLING ELONGATED OBJECTS
Filed Jan. 28, 1954　　　　　　　　　　　　3 Sheets-Sheet 3
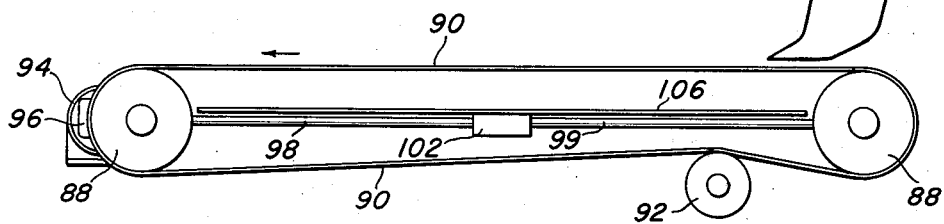
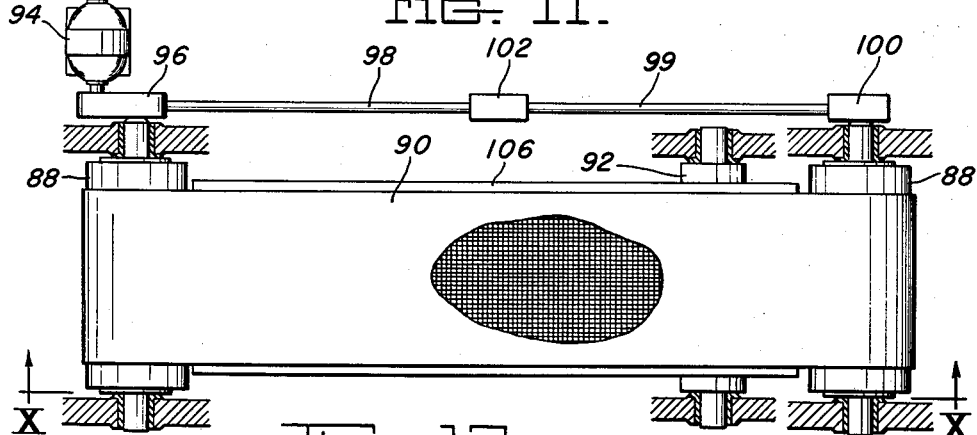
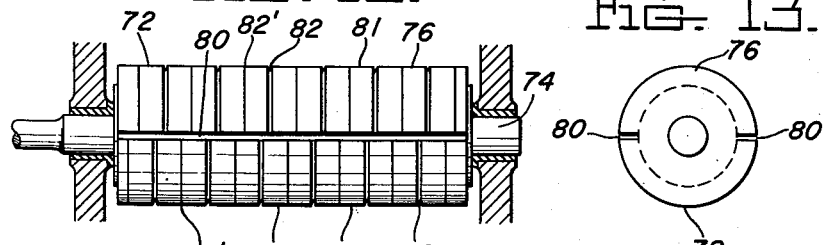
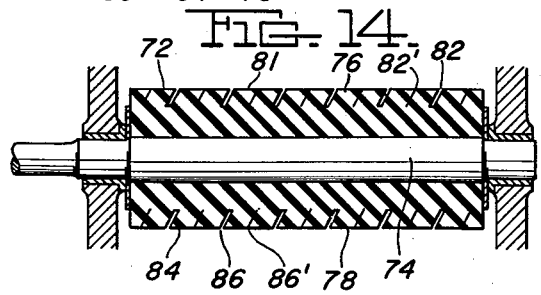
INVENTOR:
MARTIN J. CARROLL,
BY: *Donald G. Dalton*
his Attorney.

United States Patent Office 2,810,480
Patented Oct. 22, 1957

2,810,480

APPARATUS FOR HANDLING ELONGATED OBJECTS

Martin J. Carroll, Pittsburgh, Pa., assignor to United States Steel Corporation, a corporation of New Jersey Application January 28, 1954, Serial No. 406,698

17 Claims. (Cl. 209—308)

This invention relates to apparatus for handling elongated objects and more particularly to such apparatus which will reciprocate the objects transversely as they move longitudinally. In many instances it is desirable to move an elongated object, such as a strip or belt, transversely as it moves longitudinally. For example, in the copending application to Orr, Serial No. 336,748, filed February 13, 1953, now Patent No. 2,714,787, an abrading machine is disclosed which is of the type that utilizes an endless abrasive belt for grinding or polishing the workpiece. The belt is normally of greater width than the width of the article being abraded and the surface of the belt is worn away across this width, thus providing spaced apart shoulders on the belt. This does not efficiently utilize the belt and also causes other difficulties. Means have been provided to move the belt axially over the supporting rolls but these means all require movement of a comparatively large mass such as one of the supporting rolls as shown in the Orr application. Such apparatus is expensive to construct and to maintain. Other applications in which it is desirable to reciprocate the belt as it passes over rolls include shaker screens for separating particles of a given size from a bed of material on the screen.

It is therefore an object of my invention to provide a roll which is so constructed that elongated objects passing thereover will be reciprocated transversely as they pass thereover.

Another object is to provide an assembly for reciprocating an endless belt as it passes over a plurality of rolls.

A further object is to provide an abrading machine in which a high speed endless belt moves with an oscillatory motion across the face of the work roll without requiring movement of any of the rolls other than about their axes.

A still further object is to provide a shaker screen which utilizes an endless belt and rolls for imparting movement to the endless belt to shake the material passing thereover.

These and other objects will be more apparent after referring to the following specification and attached drawings, in which:

Figure 1 is a vertical elevation of an abrading machine incorporating my invention;

Figure 2 is a view taken on the line II—II of Figure 1;

Figure 3 is a view taken on the line III—III of Figure 2;

Figure 4 is a view taken on the line IV—IV of Figure 2;

Figure 5 is a sectional view of one form of my improved roll;

Figure 6 is a view of the roll of Figure 5 taken from the left hand end thereof;

Figure 7 is a view of the roll of Figure 5 taken from the right hand end thereof;

Figure 8 is a sectional view of a self-centering roll which may be used in the abrading machine;

Figure 9 is a sectional view of the work roll used in the abrading machine;

Figure 10 is a view taken on the line X—X of Figure 11 and showing a shaker screen embodying my invention;

Figure 11 is a top plan view of Figure 10 with the feed hopper removed;

Figure 12 is an elevational view of a second form of my improved roll;

Figure 13 is a view of the roll of Figure 12 taken from the right hand end thereof; and Figure 14 is a longitudinal sectional view of the roll of Figure 12.

Referring more particularly to Figures 1 to 9 of the drawings, reference numeral 2 indicates an endless abrasive belt which passes around a drive roll 4. A motor 6 rotates the roll 4 to drive the endless belt 2. A tension roll 8 is mounted on the exit side of the roll 4. The roll 8 is mounted on spaced arms 10 which are pivotally mounted on pins 12. An air cylinder 14 which is pivotally mounted on machine frame 16 has its piston rod 18 connected to a member 20 which extends between and connects the arms 10 intermediate their length. A work roll 22 which is cylindrical when grinding a flat workpiece is mounted on the entry side of the roll 4. The object-reciprocating roll 24 of my invention is mounted between the rolls 8 and 22. As shown in Figures 5, 6 and 7, the roll 24 consists of two rim sections 26 and 28 having spaces 30 therebetween. The rim section 26 is fastened to a radial web 32 having a reduced diameter portion 34 and the rim section 28 is fastened to a radial web 36 having a reduced diameter portion 38. The webs 32 and 36 are keyed or otherwise fastened to a shaft 40 so that the rim sections 26 and 28 will rotate in the same direction at the same angular velocity. While it is preferred to have the shaft 40 continuous, as shown, it may be made in two coaxial sections not connected at the center. The shaft has portions extending outwardly beyond webs 32 and 36 which are supported in bearings 42. As the belt 2 passes over and around the rim section 26 the free end of the rim 26 will deflect toward the axis of the roll in a manner similar to that of each section of the rolls disclosed in the patent to Lorig, No. 2,593,158, dated April 15, 1952. This provides forces exerted on the object which have axial components extending toward the web 36. The deflection will be limited and progressive adjacent the initial point of contact with the moving object. Thus, as the belt passes over this portion of the roll it will be moved from left to right as shown in Figure 5. As the roll rotates the belt 2 will contact the rim portion 28 causing the end of the rim section 28 remote from the web 36 to deflect toward the axis of the roll in the same manner as the rim section 26. The forces exerted on the belt 2 at this point will cause the belt to move from right to left as seen in Figure 5. The amount of travel of the belt from side to side will vary depending upon the diameter and speed of the roll. The spaces 30 between the sections of roll need only be sufficient to permit the sections to move toward the axis of the roll. In some cases, especially when large diameter rolls are used, more than two sections may be provided around the periphery of the roll with alternate sections being connected to one web 32 and the other sections being connected to the other web 36, the webs being so formed that the free end of the sections can deflect toward the axis of the roll. The webs 32 and 36 are preferably of such resiliency that they can deflect slightly under load in a manner similar to that described in the above mentioned Lorig patent. In some instances it may be desirable to insert a self-centering section in the roll. In other words, a rim section supported by both webs and split on the transverse center of the roll may be inserted between the other sections. A work table 44 for supporting a workpiece W is mounted beneath the work roll 22 and is reciprocated by means of hydraulic motor 46. The work roll 22 may be pressed against workpiece W by conventional mechanism such as screws 48 one connected to each of the roll bearings 50. Each of the screws 48 is in threaded engagement with a gear 52. The gears 52 are rotated by means of worms 54 mounted on a shaft 56. A hand wheel 58 is mounted on the shaft 56 to rotate the same to adjust the position of the roll 22. The roll 8 may be an object-reciprocating roll as shown in Figure 5 or may be a self-centering roll as shown in the patent to Lorig, No. 2,593,158, dated April 15, 1952. One particular type of such a self-centering roll is shown in Figure 8 in which webs 60 having rim portions 62 secured thereto are keyed or otherwise fastened to a shaft 64. Other types of self-centering rolls may also be used such as those shown in the patent to Lorig No. 2,593,157, dated April 15, 1952. The rolls 4 and 22 may be solid cylindrical rolls or hollow cylindrical rolls as shown in Figure 9 in which a rim portion 66 is mounted on webs 68 which are keyed or otherwise fastened to a shaft 70.

The operation of the device is as follows: The belt 2 is driven from the motor 6 and the work table 44 with the workpiece W thereon is reciprocated beneath the work roll 22. Uniform tension is provided on belt 2 by means of the tension roll 8 in the usual manner. The work roll 22 is moved against workpiece W by turning the handle 58. As the belt passes over and around the roll 24 it is reciprocated in the manner described above. If the roll 8 is an object-reciprocating roll it will be adjusted so that it rotates in synchronism with the roll 24. In other words, it will be so adjusted that the corresponding rim portions of the rolls 8 and 24 will contact the belt 2 at the same time. The use of a self-centering roll in the system is desirable in order to prevent the belt 2 from moving gradually off the rolls in one or the other direction in case the sections 26 and 28 of roll 24 are not perfectly balanced. In other words, there may be a slightly greater movement to one end of the roll than to the other end of the roll. If a self-centering roll is used in the system the centering effect must not be sufficient to prevent the reciprocation of the belt by the roll 24.

Figures 12, 13 and 14 show another form of object-reciprocating roll which may be used in place of the roll of Figure 5 in the abrading machine of Figure 1 or in the machine of Figures 10 and 11. In this embodiment a sleeve 72 made of rubber, neoprene, leather, fabric or other resilient material, is mounted on a shaft 74 for rotation therewith. Sleeve 72 is divided into two portions 76 and 78 by means of diametrically opposed narrow slots or grooves 80. Section 76 has a plurality of flexible projections or laminations 81 on its outer periphery with the projections or laminations being inclined radially toward the axis of the roll away from the right hand end of the roll as shown in Figure 14. The projections 81 may be provided by means of slits or slots 82 and 82' extending around substantially one-half of the roll surface. The slits or slots 82 are formed by removing part of the rubber as shown in the patent to Lorig No. 2,592,581, dated April 15, 1952, and the slits or slots 82' by merely slitting the rubber as shown in the copending Lorig application, Serial No. 380,646, filed September 17, 1953, now Patent No. 2,772,879. The slots 82 may be alternated with slots 82', as shown, or the slots may all be of one or the other type. The other rim section 78 is provided with flexible projections or laminations 84 inclined radially toward the axis of the roll away from the left hand end of the roll as shown in Figure 14. The projections or laminations 84 are formed by means of slits or slots 86 and 86' similar to slots 82 and 82'. As an object passes over the rim section 76 it will be moved to the right as shown in Figure 14 since the forces exerted thereon have axial components extending toward the right hand end of the roll. When the object passes over the rim section 78 it will be moved to the left since the forces exerted on the object have axial components extending toward the left end of the roll. Thus, the object will reciprocate back and forth as the belt is forwarded over the roll. Roll 24 may be of this type in which case the operation of the abrading machine will be the same as described above. As in the case of the embodiment of my roll shown in Figures 5 to 7, more than two sections may be provided so that the object will reciprocate more than once in each revolution of the roll. Also, a self-centering rim section may be provided between the reciprocating sections.

In the assembly shown in Figures 10 and 11, two object-reciprocating rolls 88 are arranged in spaced apart relationship with a perforated endless belt 90 passing therearound. A self-centering roll 92 is also provided between the rolls 88. The roll 92 may be a self-centering roll such as shown in the patents to Lorig Nos. 2,592,581, 2,593,157 and 2,593,158, all dated April 15, 1952. The roll 88 on the left as seen in Figure 11 is driven from a motor 94 through a gear reducer 96 and the other roll 88 is mechanically connected to rotate at the same rate of speed as the first roll by means of shafts 98 and 99 and gearing 100. Means 102 is provided between the shafts 98 and 99 to adjust the arcuate position of a rim section of one of the rolls 88 with respect to the corresponding rim section of the other roll. Thus, the rim sections of one of said object-reciprocating rolls may be made to act in unison with the corresponding rim sections of the other object-reciprocating roll or they may be so adjusted as to cause the rim sections of one of the rolls 88 to act in opposition to corresponding rim sections of the other roll 88. In other words, as the belt 90 passes over the rolls it may either be moved in unison back and forth across the faces of the rolls or it may be moved in one direction as it passes over one of the rolls 88 and in the opposite direction as it passes over the other roll 88. The belt 90 may be provided with openings of the desired size and gravel or other granular material to be screened fed thereto from a hopper 104. As the material passes over the belt or screen 90, reciprocation of the screen 90 will shake the material, thus causing particles below a certain size to pass through the openings therein with the remaining material being discharged from the end of the belt. A shelf 106 is preferably provided between the upper and lower runs of the belt 90 to prevent undersize particles from falling on the lower run.

While several embodiments of my invention have been shown and described it will be apparent that other adaptations and modifications may be made without departing from the scope of the following claims.

I claim:

1. Apparatus for handling elongated objects comprising a rotatable roll over which the object passes, said roll including at least two sections extending over the major part of the roll width and spaced circumferentially of the roll for supporting the object, one section having a supporting surface that will deflect under load radially inwardly and away from one end of the roll and the other section having a supporting surface that will deflect under load radially inwardly and away from the other end of the roll.

2. Apparatus for handling elongated objects comprising a rotatable roll over which the object passes, said roll including at least two sections extending over the major part of the roll width and spaced circumferentially of the roll for supporting the object, a radial web at one end of the roll for supporting one end of one of said sections, the other end of said section being free to deflect under load, and a radial web at the end of the roll remote from the first radial web for supporting one end of the other sections, the other end of the last named section being free to deflect under load.

3. Apparatus for handling elongated objects comprising a rotatable roll over which the object passes, said roll including at least two rotatable rim sections extending over the major part of the roll width and spaced circumferentially of the roll for supporting the object passing thereover, spaced coaxial shaft sections, a shaft extension for at least one of said shaft sections extending outwardly beyond said rims and adapted to be supported in bearing means, means for supporting one of said rim sections on one of said shaft sections for limited and progressive deflection of the free end of said rim section adjacent the initial point of contact with the moving object in a direction transverse to the axes of the shaft section, means for supporting the other of said rim sections on the other of said shaft sections for limited and progressive deflection of the free end of said rim section adjacent the initial point of contact with the moving object in a direction transverse to the axes of the shaft sections, and means for positively causing one of said rim sections to rotate in the same direction and at the same angular velocity as the other rim section.

4. Apparatus for handling elongated objects comprising a rotatable roll over which the object passes, said roll including at least two rotatable rim sections extending over the major part of the roll width and spaced circumferentially of the roll for supporting the object passing thereover, a straight shaft, a shaft extension for said shaft extending outwardly beyond said rim sections and adapted to be supported in bearing means, means adjacent one end of said shaft for supporting one end of one of said rim sections, the other end of said section being free to deflect under load in a direction transverse to the axis of the shaft, means adjacent the other end of said shaft for supporting one end of the other of said rim sections, the other end of said last named rim section being free to deflect under load in a direction transverse to the axis of the shaft, and means for positively causing one of said rim sections to rotate in the same direction and at the same angular velocity as the other rim section.

5. Apparatus for handling elongated objects comprising a rotatable roll over which the object passes, said roll including at least two sections spaced circumferentially of the roll for supporting the object, one of said sections having a plurality of flexible projections on its outer periphery across essentially the full width of the roll, said projections being inclined radially toward the axis of the roll away from one end of the roll, the other of said sections having a plurality of flexible projections on its outer periphery across essentially the full width of the roll, said projections being inclined radially toward the axis of the roll away from the other end of the roll.

6. Apparatus for handling elongated objects comprising a rotatable roll over which the object passes, said roll including at least two sections spaced circumferentially of the roll for supporting the object, one of said sections having a plurality of closely spaced flexible laminations on its outer periphery across essentially the full width of the roll, said laminations being inclined radially toward the axis of the roll away from one end thereof, the other of said sections having a plurality of closely spaced flexible laminations on its outer periphery across essentially the full width of the roll, said laminations being inclined radially toward the axis of the roll away from the other end of the roll.

7. An abrading machine comprising an endless abrasive belt, and a plurality of rolls for supporting said belt, one of said rolls being a drive roll for driving said belt, one of said rolls being a roll for reciprocating said belt transversely, said last named roll including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll.

8. An abrading machine according to claim 7 in which one of said rolls is a self-centering roll.

9. An assembly comprising an endless belt, and a plurality of rolls for supporting said belt, one of said rolls being a roll for reciprocating said belt transversely, said last named roll including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll.

10. An assembly comprising an endless belt, and a plurality of rolls for supporting said belt, two of said rolls being rolls for reciprocating said belt transversely, each of said last named rolls including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll.

11. An assembly comprising an endless belt, and a plurality of rolls for supporting said belt, two of said rolls being rolls for reciprocating said belt transversely, each of said last named rolls including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll, and means for adjusting the arcuate position of a rim section of one of said object reciprocating rolls with respect to a rim section of the other of said object-reciprocating rolls.

12. An assembly according to claim 11 in which one of said rolls is a self-centering roll.

13. An assembly comprising an endless belt, and a plurality of rolls for supporting said belt, two of said rolls being rolls for reciprocating said belt transversely, each of said last named rolls including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll, and means for causing the rim sections of one of said object-reciprocating rolls to act in unison with the corresponding rim sections of the other object-reciprocating roll.

14. An assembly comprising an endless belt, and a plurality of rolls for supporting said belt, two of said rolls being rolls for reciprocating said belt transversely, each of said last named rolls including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll, and means for causing the rim sections of one of said object-reciprocating rolls to act in opposition to the corresponding rim sections of the other object-reciprocating roll.

15. Apparatus for screening granular material comprising an endless belt having perforations therethrough, a pair of spaced apart rolls around which the belt passes, and means for feeding granular material to the upper run of said belt, at least one of said rolls being an object-reciprocating roll, said object-reciprocating roll including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll.

16. Apparatus for screening granular material comprising an endless belt having perforations therethrough, a pair of spaced apart rolls around which the belt passes, and means for feeding granular material to the upper run of said belt, both of said rolls being object-reciprocating rolls, each of said object-reciprocating rolls including at least two sections extending over the major part of the roll width and spaced circumferentially of the roll for supporting the belt, one section having a supporting surface that will deflect under load radially inwardly and away from one end of the roll and the other section having a supporting surface that will deflect under load radially inwardly and away from the other end of the roll, and means for adjusting the arcuate position of a rim section of one of said object-reciprocating rolls with respect to a rim section of the other of said object-reciprocating rolls.

17. Apparatus for screening material according to claim 16 including a self-centering roll bearing against the lower surface of the lower run of said belt.

References Cited in the file of this patent
UNITED STATES PATENTS
2,592,581     Lorig  ----------------- Apr. 15, 1952